US008478988B2

(12) United States Patent
Nguyen et al.

(10) Patent No.: US 8,478,988 B2
(45) Date of Patent: Jul. 2, 2013

(54) SYSTEM AND METHOD FOR AUTHENTICATION OF A COMMUNICATION DEVICE

(75) Inventors: Nam Nguyen, Sa Jose, CA (US); Donggen Zhang, Fremont, CA (US); Kevin Meng, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 831 days.

(21) Appl. No.: 11/749,041

(22) Filed: May 15, 2007

(65) Prior Publication Data

US 2008/0288773 A1 Nov. 20, 2008

(51) Int. Cl.
*H04L 29/06* (2006.01)

(52) U.S. Cl.
USPC .......................................................... 713/155

(58) Field of Classification Search
USPC .......................................................... 713/155
See application file for complete search history.

(56) References Cited

U.S. PATENT DOCUMENTS

| | | | | |
|---|---|---|---|---|
| 6,081,790 | A * | 6/2000 | Rosen ............................... | 705/40 |
| 6,263,437 | B1 * | 7/2001 | Liao et al. ....................... | 713/169 |
| 6,766,453 | B1 | 7/2004 | Nessett et al. | |
| 7,047,408 | B1 | 5/2006 | Boyko et al. | |
| 2003/0031151 | A1 | 2/2003 | Sharma et al. | |
| 2003/0046412 | A1 * | 3/2003 | Tsunoda et al. ............... | 709/229 |
| 2003/0118011 | A1 * | 6/2003 | Wu et al. ......................... | 370/356 |
| 2005/0060555 | A1 * | 3/2005 | Raghunath et al. ........... | 713/186 |
| 2005/0188216 | A1 * | 8/2005 | Crispin et al. ................. | 713/190 |
| 2005/0235143 | A1 * | 10/2005 | Kelly ............................. | 713/165 |
| 2006/0046690 | A1 * | 3/2006 | Rose et al. ..................... | 455/410 |
| 2006/0105748 | A1 | 5/2006 | Ooi et al. | |
| 2006/0156007 | A1 | 7/2006 | Stephens-Doll | |
| 2007/0006296 | A1 | 1/2007 | Nakhjiri et al. | |
| 2007/0088949 | A1 | 4/2007 | England et al. | |
| 2007/0183419 | A1 * | 8/2007 | Kompella ...................... | 370/389 |
| 2007/0286170 | A1 * | 12/2007 | Khan et al. ..................... | 370/356 |

FOREIGN PATENT DOCUMENTS

| | | |
|---|---|---|
| CN | 1444169 | 9/2003 |
| JP | 2006140743 | 6/2006 |

* cited by examiner

*Primary Examiner* — Kambiz Zand
*Assistant Examiner* — Dant Shaifer Harriman
(74) *Attorney, Agent, or Firm* — Guntin & Gust, PLC; Ed Guntin (57) ABSTRACT

A system and method for authentication of a communication device is disclosed. A system that incorporates teachings of the present disclosure may include, for example, a communication device having a controller element to compute a shared secret key based at least in part on a communication device (CD) private key and a cryptography algorithm, wherein the CD private key is stored in an identity module of the communication device and is unknown to an authentication center, and wherein the communication device is authenticated by the authentication center based at least in part on the shared secret key. Additional embodiments are disclosed.

27 Claims, 4 Drawing Sheets

SYSTEM AND METHOD FOR AUTHENTICATION OF A COMMUNICATION DEVICE

FIELD OF THE DISCLOSURE

The present disclosure relates generally to communication systems, and more specifically to a system and method for authentication of a communication device.

BACKGROUND

Identity theft of communication devices has been and continues to be an issue faced by service providers and its subscribers. Some encryption algorithms utilized in network user authentication are proprietary and secret, and may have undergone only limited verification. Authentication processes can utilize a secret key stored by both the authentication system and the communication device, but hackers may attempt to obtain the secret key to impersonate the subscriber associated with the communication device.

A need therefore arises for a system and method for authentication of a communication device.

DETAILED DESCRIPTION

Embodiments in accordance with the present disclosure provide a system and method for authentication of a communication device.

In a first embodiment of the present disclosure, a computer-readable storage medium can have computer instructions for generating an authentication center (AC) private key; computing an AC public key based at least in part on the AC private key and a reference point in a cryptography algorithm; receiving a communication device (CD) public key computed by a communication device based at least in part on a CD private key and the reference point in the cryptography algorithm, wherein the CD private key is stored in an identity module of the communication device; supplying the AC public key to the communication device; computing a shared secret key based at least in part on the AC public key and the CD public key; and authenticating the communication device based at least in part on the shared secret key, wherein the shared secret key is temporarily stored by an authentication server.

In a second embodiment of the present disclosure, a communication device can have a controller element to compute a shared secret key based at least in part on a communication device (CD) private key and a cryptography algorithm, wherein the CD private key is stored in an identity module of the communication device and is unknown to an authentication center, and wherein the communication device is authenticated by the authentication center based at least in part on the shared secret key.

In a third embodiment of the present disclosure, an identity module of a communication device can have a memory updated with a communication device (CD) private key unknown to an authentication center, wherein the communication device computes a shared secret key based at least in part on the CD private key, an authentication center (AC) public key received from the authentication center, and a cryptography algorithm.

In a fourth embodiment of the present disclosure, a method of authenticating a communication device can involve computing a shared secret key at the communication device based at least in part on a communication device (CD) private key and a cryptography algorithm, the CD private key being unknown to an authentication center; computing the shared secret key at the authentication center based at least in part on an authentication center (AC) private key and the cryptography algorithm, the AC private key being unknown to the communication device; and authenticating the communication device based at least in part on the shared secret key, wherein the shared secret key is temporarily stored in the communication device and the authentication center.

Figure 1:
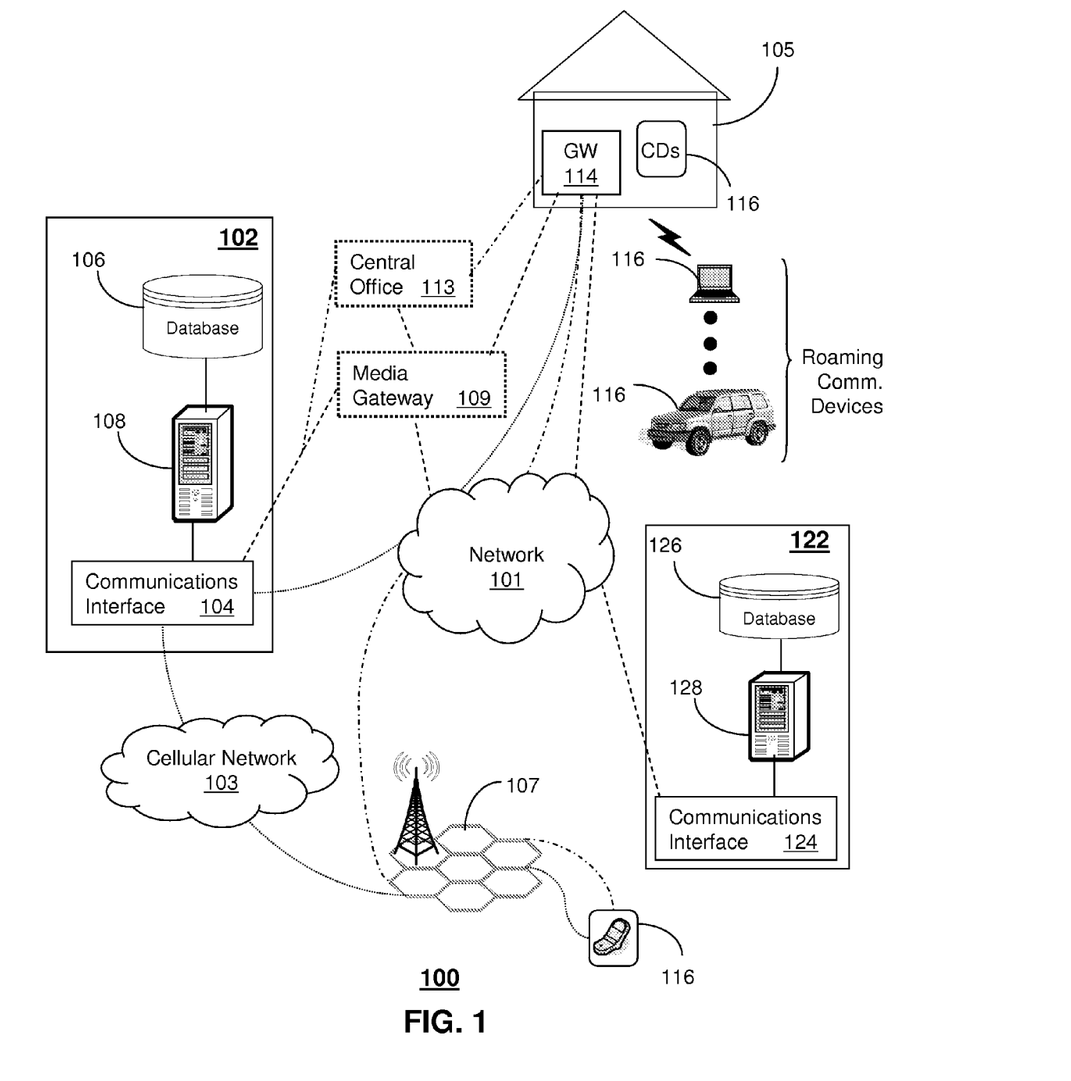
FIG. 1 depicts an exemplary embodiment of a communication system according to one or more aspects of the invention.

FIG. 1 depicts an exemplary block diagram of a communication system 100 that can supply media services to one or more fixed and/or roaming communication devices 116. The communication devices 116 can communicate by way of wired and/or wireless access points (WAPs) with other communication devices and/or a network proxy or network management system 102 which collectively operate in the communication system 100. The communication device 116 can be a mobile or wireless device. In one embodiment, the communication device 116 can be a multimode VoIP terminal. However, the present disclosure contemplates the use of other types of communication devices, including other types of voice, video and data devices. The communication system 100 can comprise a packet-switched network 101. The packet-switched network can be an Internet Service Provider (ISP) network 101. The network 101 can be coupled to the network proxy 102, a cellular network 103 and network elements, including network elements located in a building 105 representing an enterprise or residence. The ISP network 101 can utilize computing technology for transporting Internet traffic.

In an enterprise setting, the building 105 can include a gateway 114 that provides voice, video and/or data connectivity services between communication devices 116, such as VoIP terminals or other forms of communication devices of enterprise personnel. In a residential setting, the building 105 can include a gateway 114 represented by, for example, a residential gateway coupled to a central office 113 utilizing conventional telephonic switching for processing calls with third parties.

The network proxy 102 can be used to control operations of a media gateway 109, the central office 113 and/or the gateway 114. Communications between the network proxy 102, the communication devices 116 and/or other network elements of the communication system 100 can conform to any number of signaling protocols such as a session initiation protocol (SIP), or a video communications protocol such as H.323 which combines video and voice over a packet-switched network.

The network proxy 102 can comprise a communications interface 104 that utilizes common technology for communicating with the network 101, the media gateway 109, the cellular network 103, and/or the gateway 114, such as over an IP interface. By way of the communications interface 104, the network proxy 102 can direct by common means any of the foregoing network elements to establish packet switched data, voice, and/or video connections between communication devices 116 distributed throughout the communication system 100. The network proxy 102 can further comprise a memory 106 (such as a high capacity storage medium) embodied in this illustration as a database, and a controller 108 that can make use of computing technology such as a desktop computer, or scalable server for controlling operations of the network proxy 102. The network proxy 102 can operate as an IP Multimedia Subsystem (IMS) conforming in part to protocols defined by standards bodies such as 3GPP (Third Generation Partnership Protocol).

Under the control of the network proxy 102, the media gateway 109 can link packet-switched and circuit-switched technologies such as the cellular network 103 (or central office 113) and the network 101, such as an ISP network. The media gateway 109 can conform to a media gateway control protocol (MGCP) also known as H.248 defined by work groups in the Internet Engineering Task Force (WETF). This protocol can handle signaling and session management needed during a multimedia conference. The protocol defines a means of communication which converts data from the format required for a circuit-switched network to that required for a packet-switched network. MGCP can therefore be used to set up, maintain, and terminate calls between multiple disparate network elements of the communication system 100. The media gateway 109 can therefore support hybrid communication environments for communication devices 116, including VoIP terminals.

The central office 113 can house common network switching equipment for distributing local and long-distance telecommunication services supplied by network 101 to building 105. Telecommunication services of the central office 113 can include traditional POTS (Plain Old Telephone Service) and broadband services such as HDTV, DSL, VoIP (Voice over Internet Protocol), IPTV (Internet Protocol Television), Internet services, and so on. The communication system 100 can utilize common computing and communications technologies to support circuit-switched and/or packet-switched communications, including MPLS (MultiProtocol Label Switching).

The cellular network 103 can support voice and data services over a number of access technologies such as GSM-GPRS, EDGE, CDMA-1X, UMTS, WiMAX, software defined radio (SDR), and other known and future technologies. The cellular network 103 can be coupled to base stations 107 under a frequency-reuse plan for communicating over-the-air with roaming communication devices 116, such as VoIP terminals.

Communication system 100 can further comprise an authentication center 122 having a communications interface 124 that utilizes common technology for communicating over the network 101, the media gateway 109, the cellular network 103, and/or the gateway 114. The authentication center 122 can further comprise a memory 126 (such as a high capacity storage medium) embodied in this illustration as a database, and a controller 128 that makes use of computing technology such as a desktop computer, or scalable server for controlling operations of the authentication center. The authentication center 122 is illustrated as a separate entity from the network proxy 102. However, the present disclosure contemplates the authentication center 122 being incorporated into the network proxy 102, including sharing one or more common components. The present disclosure also contemplates the authentication center 122 being a plurality of entities, such as in a distributed authentication system.

Figure 2:
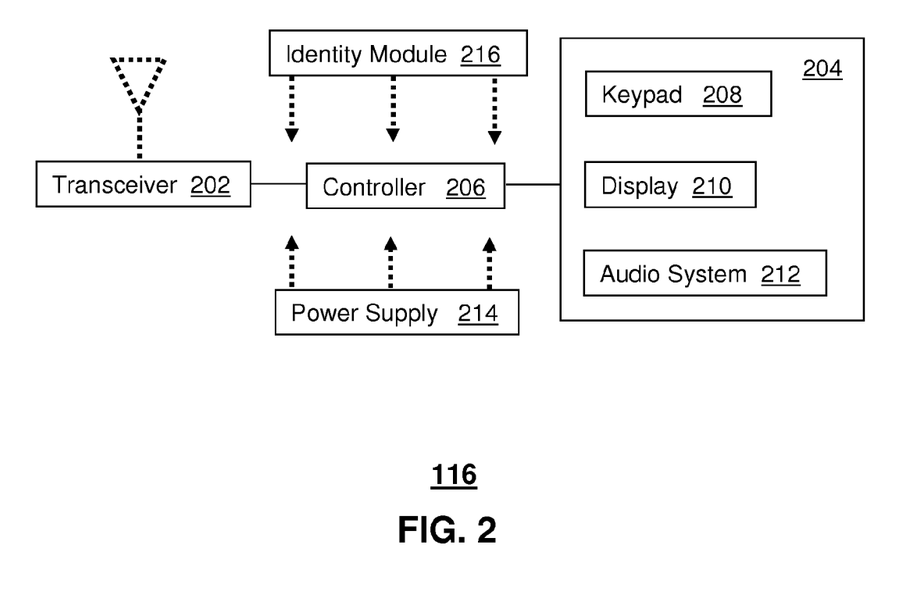
FIG. 2 depicts an exemplary block diagram of one of several embodiments for a communication device operating in the communication system according to one or more aspects of the invention.

FIG. 2 depicts an exemplary embodiment of a communication device 116 that is mobile or wireless. The wireless communication device 116 can comprise a wireless transceiver 202, a user interface (UI) 204, a power supply 214, and a controller 206 for managing operations thereof. The transceiver 202 can utilize common technologies to support singly or in combination any number of wireless access technologies including without limitation cordless phone technology (e.g., DECT), Bluetooth™, Wireless Fidelity (WiFi), Worldwide Interoperability for Microwave Access (WiMAX), Ultra Wide Band (UWB), software defined radio (SDR), and cellular access technologies such as CDMA-LX, W-CDMA/HSDPA, UMTS, GSM/GPRS, TDMA/EDGE, and EVDO. SDR can be utilized for accessing a public or private communication spectrum according to any number of communication protocols that can be dynamically downloaded over-the-air to the communication device 116. It should be noted also that next generation wireless access technologies can be applied to the present disclosure.

The UI 204 can include a keypad 208 with depressible or touch sensitive navigation disk and keys for manipulating operations of the communication device 116. The UI 204 can further include a display 210 such as monochrome or color LCD (Liquid Crystal Display) for conveying images to the end user of the communication device 116, and an audio system 212 that utilizes common audio technology for conveying and intercepting audible signals of the end user.

The power supply 214 can utilize common power management technologies such as replaceable batteries, supply regulation technologies, and charging system technologies for supplying energy to the components of the communication device 116 and to facilitate portable applications. In stationary applications, the power supply 214 can be modified so as to extract energy from a common wall outlet and thereby supply DC power to the components of the communication device 116. The controller 206 can utilize computing technologies such as a microprocessor and/or digital signal processor (DSP) with associated storage memory such a Flash, ROM, RAM, SRAM, DRAM or other like technologies for controlling operations of the aforementioned components of the communication device 116. The memory of the controller 206 can have operational data stored therein, as well as personalized data including contact book entries, calendar entries, still pictures, ring tones, wallpapers, music, video recordings, movies and games.

The communication device 116 can also comprise an identity module 216. In one embodiment, the identity module 216 can be removably connectable to the communication device 116 to provide for selective coupling with the controller 206 of the communication device. The identity module 216 can have a memory for storage of various data including an international circuit card identification (ICCID), international mobile subscriber identity (IMSI), authentication information, a local area identity (LAI), a short message service center (SMSC) number, service provider name (SPN), service dialing numbers (SDN), and value added service (VAS) applications. The data can also be personalized data including contact book entries, calendar entries, still pictures (e.g., JPEG or GIF files), ring tones (e.g., MIDI files), wallpapers, audio (e.g., MP3 files), video recordings (e.g., captured by a camera coupled with the communication device 116), movies (e.g., MP4 or WAV files), and games.

In one embodiment, the identity module 216 can be a subscriber identity module (SIM) card, a universal subscriber identity module (USIM) card or a removable user identification module (RUIM) card. In another embodiment, the identity module 216 can be a Willcom-SIM (W-SIM) card having one or more core components of the communication device 116 therein, such as a W-SIM card for a cellular telephone with the radio receiver and transmitter built into the card.

Figure 3:
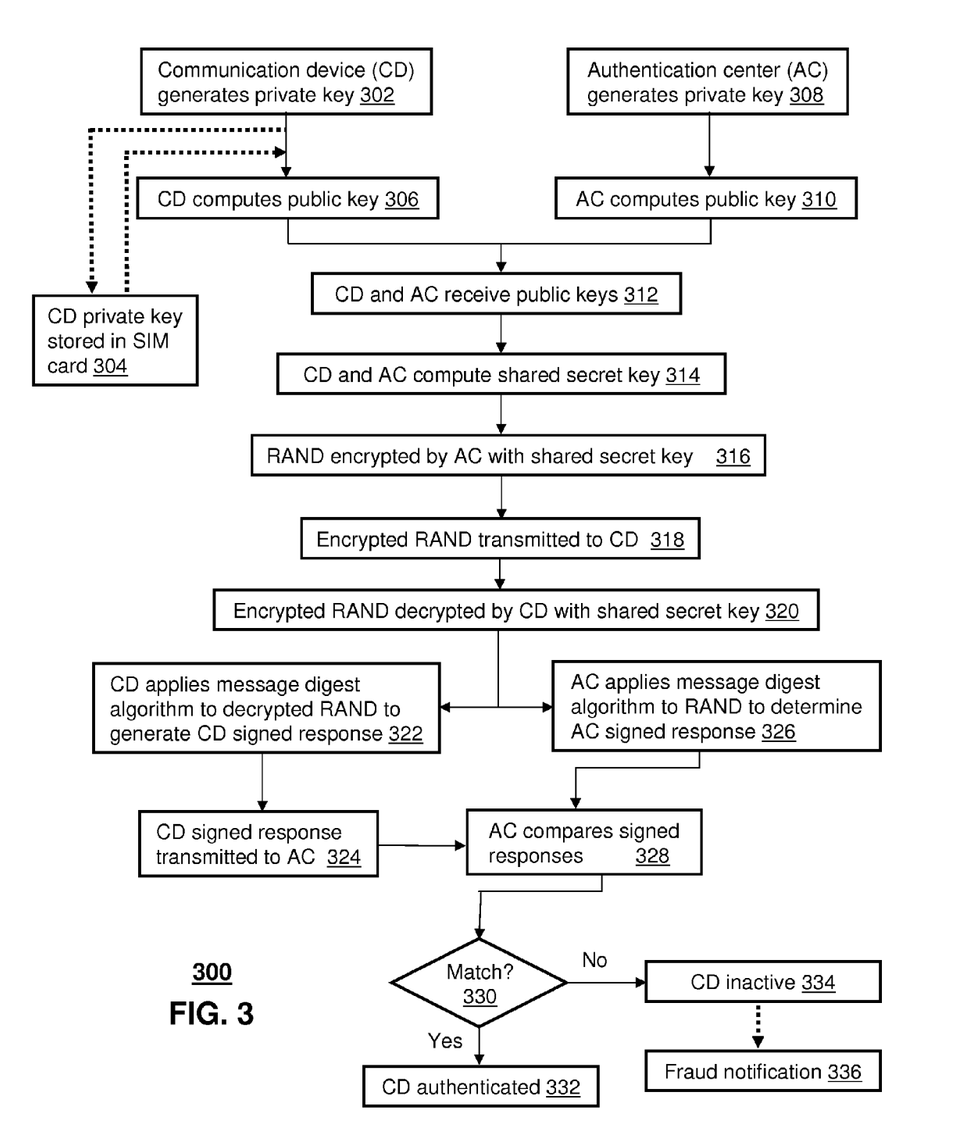
FIG. 3 depicts an exemplary method operating in portions of the communication system according to one or more aspects of the invention.

FIG. 3 depicts an exemplary method 300 operating in portions of the communication system 100. Method 300 has variants as depicted by the dashed lines. It would be apparent to an artisan with ordinary skill in the art that other embodiments not depicted in FIG. 3 are possible without departing from the scope of the claims described below.

Method 300 can begin with step 302 in which the communication device 116 generates or otherwise obtains a communication device (CD) private key. The CD private key can be unknown to the authentication center 122. In one embodiment, the communication device 116 can be provided with a CD private key, which can be stored in the identity module 216 (e.g., SIM card) of the communication device, as in step 304. For example, the CD private key can be provided to the communication device 116 during manufacture of the communication device. In another embodiment, the CD private key can be provided to the SIM card 216, such as during manufacture of the SIM card. In yet another embodiment, the communication device 116 can randomly generate the CD private key or retrieve the CD private key from another source.

In step 306, the communication device 116 can compute a CD public key using the CD private key and an encryption algorithm. The encryption algorithm can be various types of cryptography, including public key cryptography. In one embodiment, the communication device 116 computes the CD public key based on the CD private key and an elliptic curve algorithm using a base point. The elliptic curve algorithm can utilize smaller key sizes to provide a more efficient runtime performance.

The present disclosure contemplates other encryption algorithms being utilized by the communication device 116 to generate the CD public key from the CD private key, such as the Rivest Shamir Adleman (RSA) algorithm or Diffie-Hellman algorithm. In one embodiment, the algorithm and associated information, such as, for example, the elliptic curve algorithm and base point, can be stored in the communication device 116 and/or the SIM card. In another embodiment, the algorithm and associated information can be retrieved from another source.

Subsequent to or contemporaneously with steps 302-306, the authentication center 122 can generate or otherwise obtain an authentication center (AC) private key that is associated with the communication device 116, as in step 308. The AC private key can be unknown to the communication device 116. In one embodiment, the communication device 116 can transmit a registration or authentication request to the authentication center 122 so that the authentication center commences step 308 at or near the time that steps 302-306 are being performed by the communication device. Other time sequences are also contemplated by the present disclosure, such as the authentication center 122 commencing step 308 upon receipt of the CD public key, as will be described later. In step 310, the authentication center 122 can compute an AC public key using the AC private key and an encryption algorithm corresponding to the algorithm utilized by the communication device 116, such as the elliptic curve algorithm using the base point.

In step 312, the communication device 116 and the authentication center 122 can transmit and exchange the AC and CD public keys, respectively. The communication device 116 and authentication center 122 in step 314 can independently compute a shared secret key utilizing the respective AC and CD public keys that were received, in combination with their own public key that was computed in steps 306 or 310.

The authentication center 122 in step 316 can encrypt data, such as a randomly generated number (RAND), using its independently computed shared secret key, and can transmit the encrypted RAND to the communication device 116 in step 318. Upon receipt of the encrypted RAND, the communication device 116 in step 320 can decrypt the encrypted RAND using its independently computed shared secret key to obtain the plain text RAND. The shared secret key that was independently computed by the communication device 116 and by the authentication center 122 in step 314 can be temporarily stored by the communication device and the authentication center for use in the encryption of step 316 and decryption of step 320. In one embodiment, after the encryption and subsequent decryption of the RAND, the shared secret key is deleted or otherwise removed from the communication device 116 and the authentication center 122.

In step 322, the communication device 116 can apply another encryption algorithm to the plain text RAND to generate a CD signed response. In one embodiment, the communication device 116 can generate the CD signed response by applying a message digest algorithm to the plain text RAND, such as a secure hash algorithm (e.g., SHA-1). The communication device 116 can transmit the CD signed response to the authentication center 122, as in step 324. Subsequent to or contemporaneously with steps 322-324, the authentication center 122 in step 326 can generate an AC signed response using the plain text RAND and an encryption algorithm corresponding to the algorithm utilized by the communication device 116, such as SHA-1.

In step 328, the authentication center 122 can compare the AC signed response with the received CD signed response. If in step 330 the authentication center 122 determines that the signed responses match, then in step 332 the communication device 116 can be authenticated and enabled for use. If on the other hand, the authentication center 122 determines that the AC signed response does not match the CD signed response, then in step 334 the authentication can result in a failure and the communication device 116 can remain inactive. In one embodiment, a fraud notification can be transmitted to an administrator, subscriber or other interested party to notify of the failure of the authentication of the particular communication device 116, as in step 336.

From the foregoing descriptions, it would be evident to an artisan with ordinary skill in the art that the aforementioned embodiments can be modified, reduced, or enhanced without departing from the scope and spirit of the claims described below. For example, the communication device 116 can perform the generation and encryption of the RAND, while the authentication center 122 receives and decrypts the encrypted RAND. In one embodiment, a third party can be utilized for supplying the communication device 116 and the authentication center 122 with the CD and AC private keys, as well as the encryption algorithm and associated information, such as the elliptic curve algorithm and base point. Additional steps can be taken in response to a failed authentication. For example, the process can be repeated a second time utilizing different CD and AC private keys to confirm the authentication failure. In one embodiment, the communication device 116 can be disabled if a second authentication failure occurs. These are but a few examples of the modifications that can be applied to the present disclosure without departing from the scope of the claims. Accordingly, the reader is directed to the claims for a fuller understanding of the breadth and scope of the present disclosure.

Figure 4:
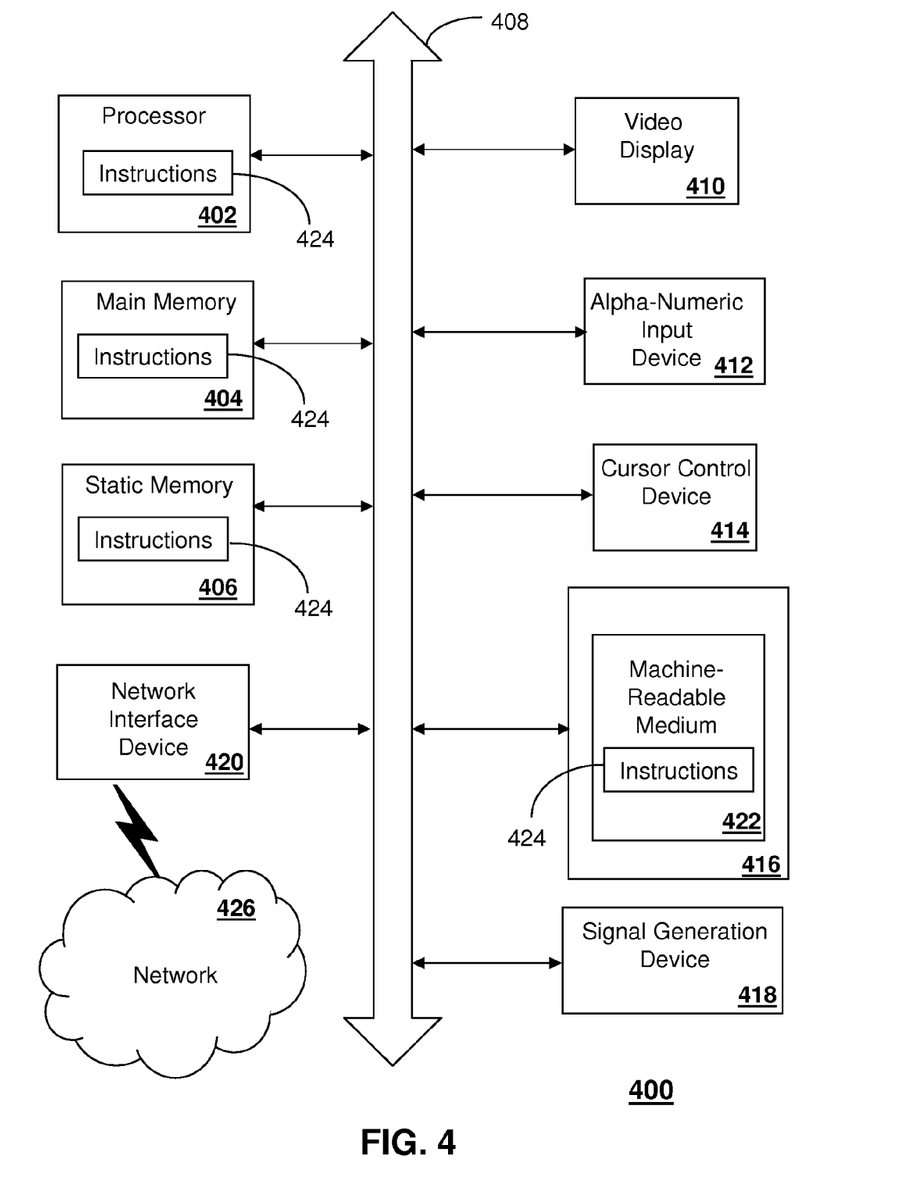
FIG. 4 depicts an exemplary diagrammatic representation of a machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a mass storage medium 416, a signal generation device 418 (e.g., a speaker or remote control) and a network interface device 420.

The mass storage medium 416 may include a computer-readable storage medium 422 on which is stored one or more sets of instructions (e.g., software 424) embodying any one or more of the methodologies or functions described herein, including those methods illustrated above. The computer-readable storage medium 422 can be an electromechanical medium such as a common disk drive, or a mass storage medium with no moving parts such as Flash or like non-volatile memories. The instructions 424 may also reside, completely or at least partially, within the main memory 404, the static memory 406, and/or within the processor 402 during execution thereof by the computer system 400. The main memory 404 and the processor 402 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the computer-readable storage medium 422 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions that, when executed by a processor, causes the processor to perform operations comprising:
   generating an authentication center private key at an authentication center, wherein the authentication center comprises a network proxy including a communication interface for communicating with a gateway that provides voice, video, internet protocol television and data communication services between voice over internet protocol terminals;
   computing an authentication center public key based at least in part on the authentication center private key and a reference point in a cryptography algorithm;
   receiving a communication device public key computed by a communication device based at least in part on a communication device private key and the reference point in the cryptography algorithm, wherein the communication device private key is stored in an identity module of the communication device, wherein the communication device private key is provided to the communication device from a third party network, wherein the cryptography algorithm is an elliptic curve algorithm having a base point, wherein the third party network is operated by a single party source, and wherein the authentication center private key, the communication device private key, and the elliptic curve algorithm and base point are supplied to the authentication center and the communication device by the single party source;
   supplying the authentication center public key to the communication device;
   computing a shared secret key based at least in part on the authentication center public key and the communication device public key; and
   authenticating the communication device based at least in part on the shared secret key, wherein the shared secret key is temporarily stored by an authentication server, wherein the authentication center private key is provided to the authentication server from the third party network.

2. The non-transitory storage medium of claim 1, wherein the operations comprise removing the shared secret key from a memory of the authentication server.

3. The non-transitory storage medium of claim 1, wherein the operations comprise:
   encrypting data utilizing the shared secret key;
   supplying the encrypted data to the communication device;
   receiving a signed response from the communication device; and
   authenticating the communication device based at least in part on the signed response.

4. The non-transitory storage medium of claim 3, wherein the encrypted data is a random number.

5. The non-transitory storage medium of claim 3, wherein the operations comprise decrypting the signed response according to a message digest algorithm.

6. The non-transitory storage medium of claim 1, wherein the cryptography algorithm comprises public key cryptography.

7. The non-transitory storage medium of claim 6, wherein the public key cryptography comprises an elliptic curve cryptography, and wherein the reference point is a base point of the elliptic curve cryptography.

8. A communication device, comprising:
   a memory to store computer instructions; and
   a controller element coupled to the memory, wherein the controller element, responsive to executing the computer instructions, performs operations comprising:
      computing a shared secret key based at least in part on a communication device private key and a cryptography algorithm,
      wherein the communication device private key is stored in an identity module of the communication device and is unknown to an authentication center,
      wherein the communication device is authenticated by the authentication center based at least in part on the shared secret key,
      wherein the communication device private key is provided to the communication device from a third party network,
      wherein the cryptography algorithm is an elliptic curve algorithm having a base point,
      wherein the third party network is operated by a single party source,
      wherein an authentication center private key, the elliptic curve algorithm and base point are supplied to the authentication center and the communication device by the single party source, and
      wherein the authentication center comprises a network proxy including a communication interface for communicating with at least a gateway that provides voice, video, internet protocol television, and data communication services between at least voice over internet protocol terminals.

9. The communication device of claim 8, wherein the identity module comprises identification information corresponding to a subscriber associated with the communication device.

10. The communication device of claim 8, wherein the identity module is a subscriber identity module card, a universal subscriber identity module card, a removable user identity module card, or Willcom subscriber identity module card.

11. The communication device of claim 8, wherein the authentication center private key is provided to the authentication center from the third party network.

12. The communication device of claim 8, wherein the operations comprise:
computing a communication device public key based at least in part on the communication device private key and the cryptography algorithm;
receiving an authentication center public key from the authentication center;
supplying the communication device public key to the authentication center; and
computing the shared secret key based at least in part on the authentication center public key.

13. The communication device of claim 12, wherein the shared secret key is temporarily stored in the communication device.

14. The communication device of claim 13, wherein the operations comprise:
receiving encrypted data from the authentication center; and
decrypting the encrypted data into plain text based at least in part on the shared secret key.

15. The communication device of claim 14, wherein the operations comprise:
generating a signed response based at least in part on the plain text; and
supplying the signed response to the authentication center for authentication of the communication device.

16. The communication device of claim 15, wherein the operations comprise:
encrypting the plain text into the signed response based at least in part on a message digest algorithm.

17. The communication device of claim 12, wherein the cryptography algorithm comprises public key cryptography.

18. The communication device of claim 17, wherein the public key cryptography comprises an elliptic curve cryptography, and wherein execution of the computer instructions causes the controller element to perform operations comprising utilizing a base point of the elliptic curve cryptography to compute the communication device public key.

19. An identity module of a communication device, the identity module comprising a memory updated with a communication device private key unknown to an authentication center, wherein the communication device computes a shared secret key based at least in part on the communication device private key, an authentication center public key received from the authentication center, and a cryptography algorithm, wherein the cryptography algorithm is an elliptic curve algorithm having a base point, wherein the communication device private key is provided to the communication device from a third party network, wherein the third party network is operated by a single party source, wherein an authentication center private key, the elliptic curve algorithm and base point are supplied to the authentication center and the communication device by the single party source, and wherein the authentication center comprises a network proxy including a communication interface for communicating with at least a gateway that provides voice, internet protocol television and data communication services between at least voice over internet protocol terminals.

20. The identity module of claim 19, comprising identification information corresponding to a subscriber associated with the communication device.

21. The identity module of claim 19, wherein the shared secret key is temporarily stored in the communication device and wherein the authentication center private key is provided to the authentication center from the third party network.

22. A method, comprising:
computing, by a system comprising a processor, a shared secret key at an authentication center based at least in part on an authentication center private key and a cryptography algorithm, the authentication center private key being unknown to a communication device, wherein the cryptography algorithm is an elliptic curve algorithm having a base point, wherein the authentication center comprises a network proxy including a communication interface for communicating with at least a gateway that provides voice, internet protocol television, and data communication services between at least voice over internet protocol terminals; and
authenticating, by the system, the communication device based at least in part on the shared secret key, wherein the shared secret key is temporarily stored in the communication device and the authentication center, wherein the authentication center private key is provided to the authentication center from a third party network, wherein the third party network is operated by a single party source, and wherein a communication device private key, the elliptic curve algorithm and base point are supplied to the authentication center and the communication device by the single party source.

23. The method of claim 22, wherein the communication device private key is stored in an identity module of the communication device.

24. The method of claim 23, wherein the identity module comprises identification information corresponding to a subscriber associated with the communication device.

25. The method of claim 23, wherein the identity module is a subscriber identity module card, a universal subscriber identity module card, a removable user identity module card, or Willcom subscriber identity module card.

26. The method of claim 23, wherein the communication device private key is provided to the communication device by the third party network, and wherein the communication device private key is used by the communication device for computing the shared key at the communication device.

27. The method of claim 22, further comprising:
computing, by the system, a communication device public key based at least in part on a communication device private key and the cryptography algorithm;
computing, by the system, an authentication center public key based at least in part on the authentication center private key and the cryptography algorithm;
transmitting, by the system, the communication device public key to the authentication center; and
transmitting, by the system, the authentication center public key to the communication device, wherein the shared secret key is computed based at least in part on the communication device and authentication center public keys and a common reference point in the cryptography algorithm wherein the cryptography algorithm comprises an elliptic curve cryptography, and wherein a base point of the elliptic curve cryptography is used to compute the communication device and authentication center public keys.

* * * * *